US009868361B2

(12) United States Patent
Barbat et al.

(10) Patent No.: US 9,868,361 B2
(45) Date of Patent: Jan. 16, 2018

(54) BATTERY IMPACT ABSORBING SYSTEM

(71) Applicant: Ford Global Technologies, LLC, Dearborn, MI (US)

(72) Inventors: Saeed David Barbat, Novi, MI (US); William L. Stanko, Canton, MI (US); Mohamed Ridha Baccouche, Ann Arbor, MI (US); Rahul Arora, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/567,188

(22) Filed: Dec. 11, 2014

(65) Prior Publication Data
US 2016/0167544 A1    Jun. 16, 2016

(51) Int. Cl.
*B60R 16/04*    (2006.01)
*B60L 11/18*    (2006.01)
*B60K 1/04*    (2006.01)
*B60R 19/42*    (2006.01)
*H01M 2/10*    (2006.01)
*B62D 21/15*    (2006.01)

(52) U.S. Cl.
CPC ............ *B60L 11/1877* (2013.01); *B60K 1/04* (2013.01); *B60R 19/42* (2013.01); *B62D 21/15* (2013.01); *H01M 2/1083* (2013.01); *H01M 2/1094* (2013.01); *B60K 2001/0438* (2013.01); *B60Y 2306/01* (2013.01); *H01M 2220/20* (2013.01)

(58) Field of Classification Search
CPC ............ H01M 2/1072; H01M 2/1083; H01M 2/1094; B60K 2001/045; B60K 2001/0405; B60K 2001/0433; B60K 2001/0438; B60K 2001/0416; B60K 1/04; B60R 16/04
USPC .................................................. 188/371, 377
See application file for complete search history.

(56) References Cited

U.S. PATENT DOCUMENTS

| 2,784,245 | A | * | 3/1957 | Coleman et al. ............. 429/100 |
| 3,859,142 | A |   | 1/1975 | Hart |
| 4,029,350 | A | * | 6/1977 | Goupy ..................... B60Q 1/26 188/377 |
| 4,227,593 | A | * | 10/1980 | Bricmont ................ F16F 7/121 188/377 |
| 4,466,646 | A | * | 8/1984 | Delmastro .............. B60R 19/50 293/117 |
| 5,066,057 | A | * | 11/1991 | Furuta ..................... B60R 19/18 293/121 |

(Continued)

FOREIGN PATENT DOCUMENTS

| CN | 103079899 | 5/2013 |
| DE | 102009053138 | 5/2011 |

(Continued)

*Primary Examiner* — James A Shriver, II
*Assistant Examiner* — Vaughn Coolman
(74) *Attorney, Agent, or Firm* — Jason C. Rogers; Bejin Bieneman PLC

(57) ABSTRACT

An impact absorbing system includes a first rocker panel and a second rocker panel spaced from the first rocker panel, a housing including a bottom extending between the first and second rocker panels and a side extending from the bottom, and an energy absorber that is deformable relative to the side and defines a repeating pattern of cells. The energy absorber is bonded to the side between the side and the first rocker panel and each cell has a central axis transverse to the side.

18 Claims, 5 Drawing Sheets

(56) References Cited

U.S. PATENT DOCUMENTS

| | | | |
|---|---|---|---|
| 5,306,066 A * | 4/1994 | Saathoff | B60J 5/0451 188/377 |
| 5,516,600 A * | 5/1996 | Cherng | 429/62 |
| 5,704,644 A * | 1/1998 | Jaggi | 280/796 |
| 5,819,408 A * | 10/1998 | Catlin | B62D 21/15 29/460 |
| 5,927,786 A * | 7/1999 | Kawai | B60R 13/0206 296/203.03 |
| 6,270,131 B1 * | 8/2001 | Martinez | B60R 19/34 188/371 |
| 6,550,850 B2 * | 4/2003 | Laborie | B60R 21/04 188/371 |
| 6,715,592 B2 * | 4/2004 | Suzuki | B60R 21/04 188/371 |
| 7,699,383 B2 * | 4/2010 | Fukukawa | B60R 19/12 293/132 |
| 7,967,350 B2 * | 6/2011 | Ginja | B60R 19/12 188/371 |
| 8,113,572 B2 * | 2/2012 | Mildner et al. | 296/209 |
| 8,157,066 B2 * | 4/2012 | Murayama | B60R 19/18 188/371 |
| 8,336,933 B2 * | 12/2012 | Nagwanshi | B60R 19/34 188/371 |
| 8,393,427 B2 | 3/2013 | Rawlinson | |
| 8,469,417 B2 * | 6/2013 | Di Modugno | B60R 19/34 293/133 |
| 8,702,161 B2 * | 4/2014 | Charbonneau et al. | 296/209 |
| 8,739,909 B2 * | 6/2014 | Hashimoto et al. | 180/68.5 |
| 8,807,303 B2 * | 8/2014 | Fukuo | B60J 5/0451 188/377 |
| 8,864,216 B2 * | 10/2014 | Nagwanshi | B62D 29/004 296/187.01 |
| 8,920,952 B2 * | 12/2014 | Bae et al. | 429/83 |
| 9,005,790 B2 * | 4/2015 | Park et al. | 429/99 |
| 9,045,030 B2 * | 6/2015 | Rawlinson et al. | |
| 9,052,168 B1 * | 6/2015 | Rawlinson | |
| 9,054,402 B1 * | 6/2015 | Rawlinson | |
| 9,059,446 B2 * | 6/2015 | Park et al. | |
| 9,327,662 B1 * | 5/2016 | Hammer | B60R 19/12 |
| 2002/0020536 A1 | 2/2002 | Bennett | |
| 2004/0003974 A1 * | 1/2004 | Ashmead | B60R 19/18 188/377 |
| 2004/0124643 A1 * | 7/2004 | Matsumoto | B60R 19/12 293/115 |
| 2011/0283873 A1 | 11/2011 | Wadley et al. | |
| 2012/0103714 A1 | 5/2012 | Choi et al. | |
| 2012/0115003 A1 * | 5/2012 | Park | H01M 2/105 429/120 |
| 2012/0121956 A1 * | 5/2012 | Park | H01M 2/0287 429/99 |
| 2012/0153643 A1 * | 6/2012 | Mana | B60R 19/12 293/120 |
| 2012/0153669 A1 * | 6/2012 | Nagwanshi et al. | 296/187.08 |
| 2012/0161472 A1 | 6/2012 | Rawlinson et al. | |
| 2012/0251863 A1 * | 10/2012 | Berger et al. | 429/99 |
| 2013/0022851 A1 * | 1/2013 | De Oliveira | 429/100 |
| 2013/0043692 A1 * | 2/2013 | Chiba | B60R 19/18 293/132 |
| 2014/0287297 A1 * | 9/2014 | Reitzle et al. | 429/163 |
| 2014/0339036 A1 * | 11/2014 | Arai | F16F 7/124 188/371 |
| 2014/0346813 A1 * | 11/2014 | Young et al. | 296/187.12 |
| 2015/0155534 A1 * | 6/2015 | Tsutsui et al. | |

FOREIGN PATENT DOCUMENTS

| | | |
|---|---|---|
| DE | 102010024320 | 12/2011 |
| DE | 102012107548 | 2/2014 |

\* cited by examiner

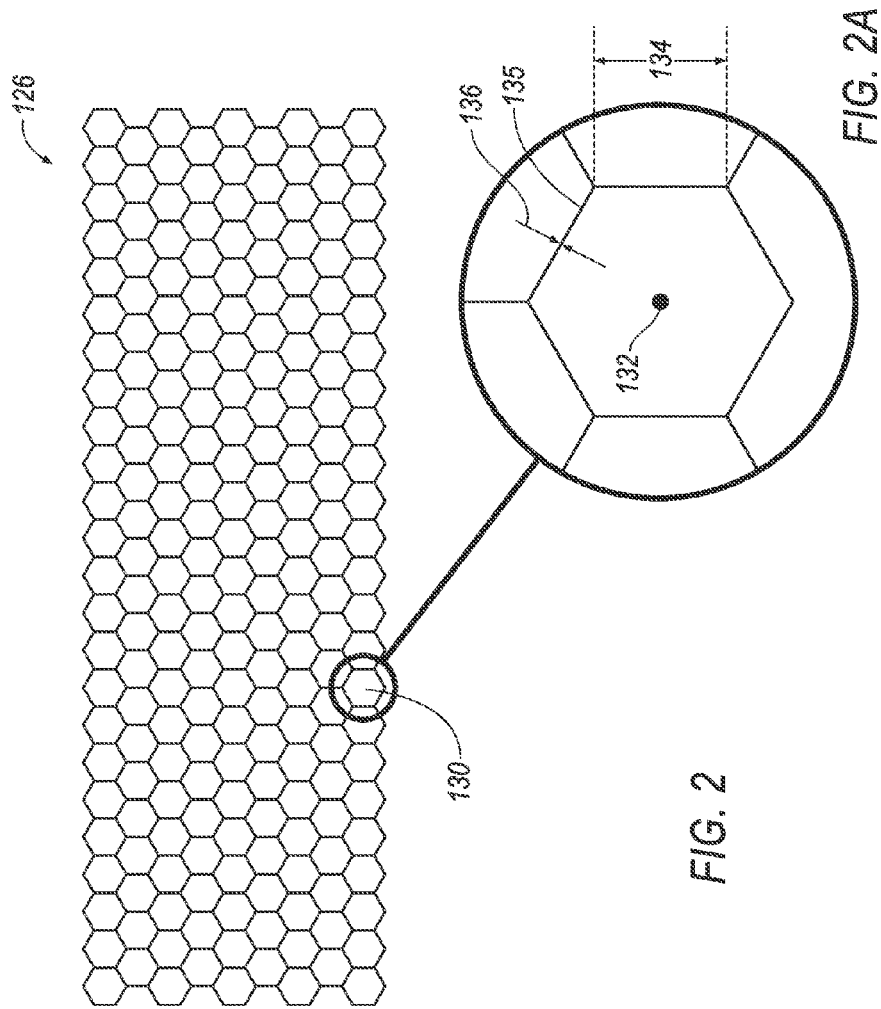

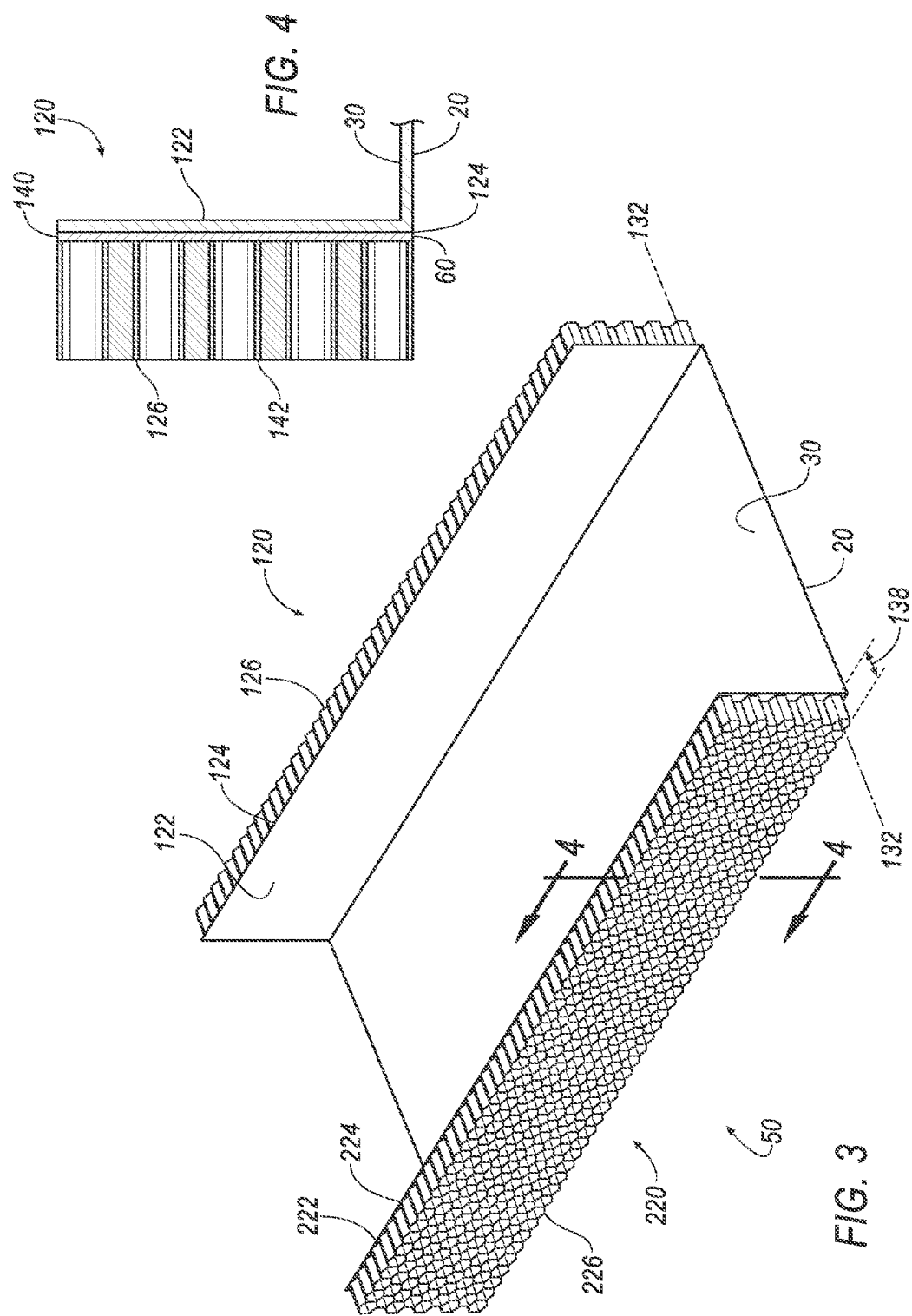

BATTERY IMPACT ABSORBING SYSTEM

BACKGROUND

Electric vehicles include one or more batteries to power the vehicle. The battery is relatively large and heavy, and the battery is subject to damage during an impact of the vehicle, i.e., during a vehicle-to-vehicle collision. Each of these factors create support and packaging constraints on the placement of the battery in the vehicle.

Specifically, the weight of the battery typically requires that the battery be mounted in a fashion that is supported by a frame of the vehicle. In addition, the relative size of the battery and the susceptibility of the battery to damage during vehicle impacts limits the placement of the battery to locations that are not only of a suitable size to house the battery, but that are also of suitable location that limits exposure of the battery during vehicle impacts. As such, there remains an opportunity to design a support system for supporting the battery in an electric vehicle to address these packaging constraints.

BRIEF DESCRIPTION OF THE DRAWINGS

FIG. 2 is a side view of an energy absorber of the impact absorbing system showing a repeating pattern of hexagonal cells.

FIG. 2A is a magnified view of a portion of FIG. 2.

FIG. 3 is a perspective view of the battery support with two energy absorbers attached to a side and a second side.

FIG. 4 is a cross-sectional view of the battery support along the line 4-4 of FIG. 3.

DETAILED DESCRIPTION

Figure 1:
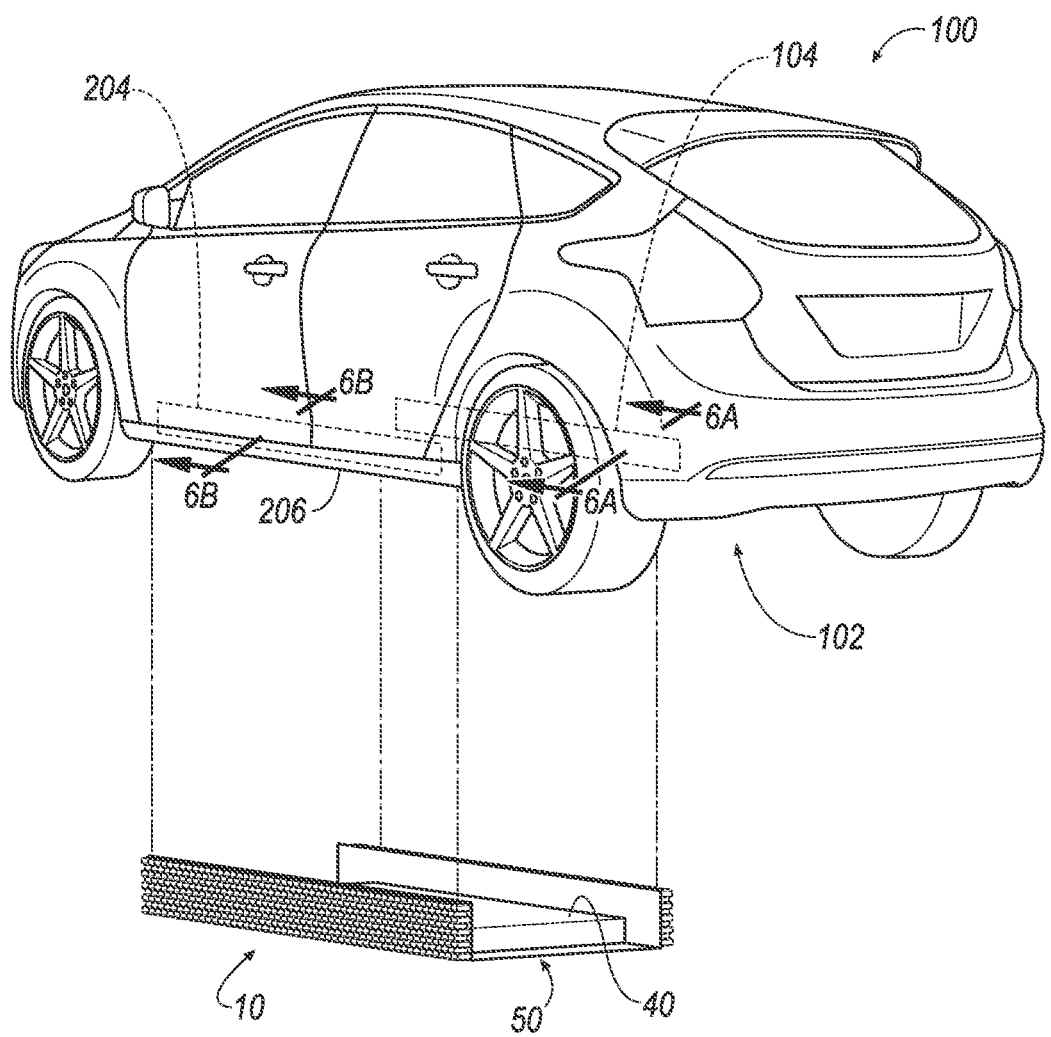
FIG. 1 is a perspective view of a vehicle with an impact absorbing system of the vehicle including a battery support and rocker panels exploded from the rest of the vehicle.

With reference to the Figures, wherein like numerals indicate like parts throughout the several views, a battery support 50 for a battery 40 of an electric vehicle EV is generally shown. With reference to FIG. 3, the battery support 50 includes a housing 20 including a bottom 30 and a side 120 extending from the bottom 30. The side 120 presents an inner surface 12 and an outer surface 124. The housing 20 is configured to receive the battery 40 for the electric vehicle at the inner surface 122. The battery support 50 includes an energy absorber 126 that is deformable relative to the side 120 and defines a repeating pattern of cells 130. The energy absorber 126 is bonded to the outer surface 124 of the side 120 and each cell 130 has a central axis 132 transverse to the outer surface 124.

With reference to FIG. 1, the battery support 50 is a component of an impact vehicle absorbing system 10 of the vehicle. The impact absorbing system 10 includes a first rocker panel 106 and a second rocker panel 206 spaced from the first rocker panel 106. The housing 20 of the battery support 50 extends between the first rocker panel 106 and the second rocker panel 206. The energy absorber 126 is bonded to the side 120 between the side 120 and the first rocker panel 106.

By bonding the energy absorber 126 to the side 120, the battery support 50 can extend between the first and second rocker panels 106, 206, limiting exposure of the battery 40 during impact. In particular, the battery 40 can span the width of the vehicle while maintaining a shallower profile that is less susceptible to impact and easier to install. Furthermore, the energy absorber 126 absorbs more energy during impact by elastically and plastically deforming in a direction parallel to the impact. The cells 130 absorb more energy along the central axis 132, limiting energy transfer to the side 120 and the battery 40.

The vehicle is an electric vehicle EV powered by the battery 40. The vehicle has a frame (not shown) that supports a body 102 of the vehicle 100. The body 102 includes a first rocker flange 104 and a second rocker flange 204. The first rocker flange 104 supports the first rocker panel 106, and the second rocker flange 204 supports the second rocker panel 206. The battery support 50 is supported by the frame, e.g., may be mounted directly to the frame, such that the battery support 50 supports the battery 40 on the frame.

The battery 40 may be of any suitable type for powering the propulsion of the electric vehicle EV. For example, the battery 40 may be a lead-acid battery, a nickel metal hydride battery, a sodium battery, a lithium ion battery, etc. The battery 40 may extend along a lower portion of the electric vehicle EV, e.g., beneath the passenger compartment, from the side 120 of the battery support 50 to a second side 220 of the battery support 50, as set forth further below. In an embodiment, the battery may have a mass of 400-500 kg, e.g., 450 kg.

The housing 20 is positioned between the first rocker panel 106 and the second rocker panel 206. The bottom 30 of the housing 20 may extend between the first rocker panel 106 and the second rocker panel 206 and, more specifically, may extend from the first rocker panel 106 to the second rocker panel 206. In such an embodiment, the first rocker flange 104 may be disposed between a portion of the first rocker panel 106 and the housing 20, and the second rocker flange 204 may be disposed between a portion of the second rocker panel 206 and the housing 20. In one embodiment, as shown in the Figures, the side 120 may be perpendicular to the bottom 30. In such an embodiment, the side 120 may extend vertically 200-300 mm from the bottom 30, e.g., 266 mm. Alternatively the side 120 may extend at a non-perpendicular angle relative to the bottom 30. The battery 40 may extend between the first rocker panel 106 and the second rocker panel 206, minimizing depth of the battery 40 beneath the vehicle 100 and easing packaging constraints.

The energy absorber 126 is bonded to the outer surface 124 of the side 120 and extends between the side 120 and the first rocker panel 106. Bonding the energy absorber 126 to the side 120 increases energy absorption of the energy absorber 126 during impact. FIG. 4 shows the energy absorber 126 bonded to the outer surface 124 by bonding material 60. The bonding material 60 may be brazing material, adhesive, or any other suitable intermediate material for bonding the energy absorber 126 to the outer surface 124. The energy absorber 126 may be fixed to the outer surface 124 in any suitable configuration, including welding, brazing, adhesives, or compression fit.

The energy absorber 126 and the housing 20 may be formed of the same type of material. As one example, the energy absorber 126 and the housing 20 may be aluminum. For example, the aluminum may be aluminum alloy 6111-T4 with a yield strength of 220 MPa, a Young's modulus of 70 GPa, and a density of $2.7 \times 10^{-6}$ kg/mm$^3$. The 6111-T4 alloy may be spot welded and is light-weight to allow for a reduction of weight while easing manufacturing and maintaining proper energy absorbing characteristics. Alternatively, the energy absorber 126 and the housing may be formed of different types of material. In any event, the energy absorber 126 and the housing 20 may be formed of any suitable material.

As set forth above, the energy absorber 126 defines the repeating pattern of cells 130. When impacted, e.g., during a side impact of the vehicle 100, the cells 130 absorb impact energy by elastic and plastic deformation. The deformation characteristics may be defined by the shape and configuration of the cells 130. The repeating pattern of cells 130 allows for ease of manufacturing and consistent deformation characteristics along the energy absorber 126.

As set forth above, each cell 130 has a central axis 132 transverse to the side 120. The central axis 132 of each cell 130 may be parallel to each other central axis 132 of each other cell 130. The central axis 132 of each cell 130 may be perpendicular to the side 120. In such a configuration, with the central axes 132 of all of the cells 130 parallel to each other and perpendicular to the side 120, the central axes 132 may be parallel to a load in an impact, such as a side impact of the vehicle 100, allowing the energy absorber 126 to increase its energy absorption relative to its deformation.

The cells 130 may be polygonal, such as triangular or hexagonal. The use of polygonal cells allows for uniform planar tiling, saving space between the cells 130. For example, hexagonal cells can be tessellated into a honeycomb structure, as shown in FIG. 2. The cells 130 may also be rhombi for rhombille tiling, isosceles triangles in a triakis triangular tiling, or pentagons in a Cairo pentagonal tiling. The cells 130 may also include combinations of different polygons in the same tiling, such as a rhombitrihexagonal tiling (hexagons, squares, and triangles) or a truncated trihexagonal tiling (dodecagons, hexagons, and squares). The energy absorber 126 may use any suitable combination of polygonal cells.

For polygonal cells, a side length 134 is defined as the length of one of the sides of the polygon. In a regular polygon, for example, all side lengths 134 are the same. For example, FIG. 2A shows the cell 130 as a regular hexagon with the side length 134.

Figure 6A:
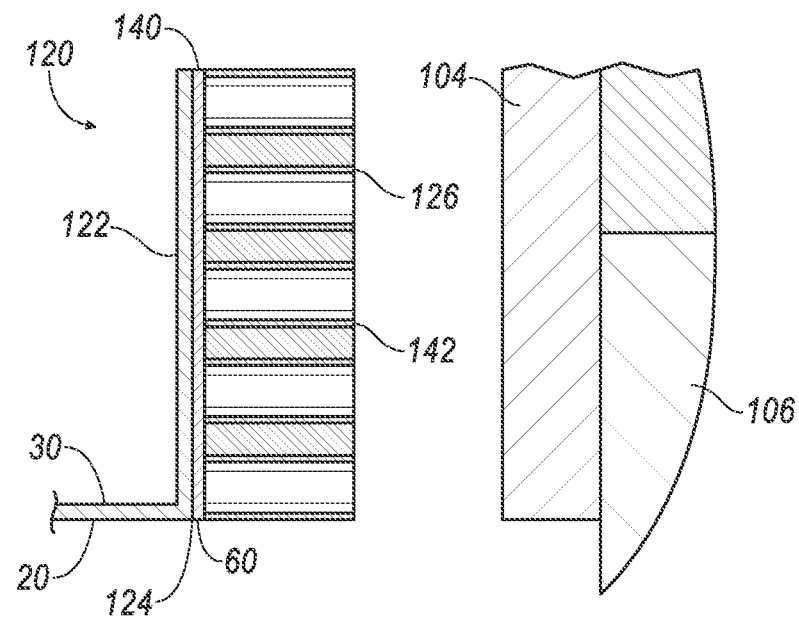
FIG. 6A is a cross-sectional view of a side of the battery support, a first rocker flange, and a first rocker panel along the line 6A-6A of FIG. 1 when the battery support is installed in the vehicle of FIG. 1.
Figure 6B:
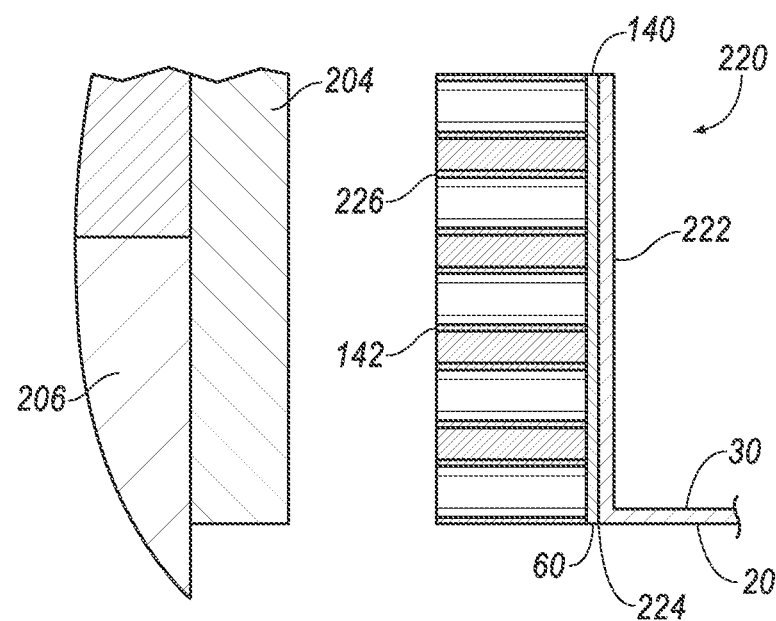
FIG. 6B is a cross-sectional view of another side of the battery support, a second rocker flange, and a second rocker panel along the line 6B-6B of FIG. 1 when the battery support is installed in the vehicle of FIG. 1.

Each cell 130 has a cell wall 135 with a cell wall thickness 136 as shown in FIG. 2. With reference to the first rocker flange 104 and the energy absorber 126 shown in FIGS. 4 and 6A, the cell wall 135 of each cell 130 extends from an exposed end 142, i.e., spaced from the first rocker flange 104 as shown in FIG. 6A, to a bonded end 140 directly bonded to the side 120, as shown in FIGS. 4 and 6A. Similarly, with reference to the second rocker flange 204 and the energy absorber 226 shown in FIG. 6B, the cell wall 135 of each cell 130 extends from an exposed end 142, i.e., spaced from the second rocker flange 204 as shown in FIG. 6B, to a bonded end 140 directly bonded to the side 220, as shown in FIG. 6B.

The ratio between the side length 134 and the cell wall thickness 136 may be optimized for controlled deformation of the energy absorber 126. The ratio depends on the material, geometry, and expected load of the energy absorber 126. In an embodiment, the ratio between the side length 134 and the cell wall thickness 136 is between 170 and 190. Specifically, the side length 134 of the cell 130 in FIG. 2A may be 19 mm and the cell wall thickness 136 may be 0.1 mm, resulting in a ratio of 190. Proper control of deformation allows for greater energy absorption in the energy absorber 126 and lower energy transfer to the housing 20. For example, with the ratio of 190, the deformation of the energy absorber 126 absorbs impact energy while reducing the amount of material needed for the energy absorber 126.

Each cell 130 has a length 138 along the central axis 132 as shown in FIG. 3. The length 138 may be selected based on several factors, e.g., the distance between the side 120 and the first and second rocker panels 100, 200 or the desired deformation of the cells 130. In an embodiment, the length 138 may be 50 mm.

The battery support 50 may include a second side 220 spaced from the side 120 as shown in FIG. 3. The second side 220 presents a second inner surface 222 facing the inner surface 122 of the side 120 and a second outer surface 224. In an embodiment, the side 120 and the second side 220 are spaced 800-1000 mm apart, e.g., 900 mm apart.

A second energy absorber 226 may be bonded to the second outer surface 224. The second energy absorber 226 extends between the second side 220 and the second rocker panel 206. The second energy absorber 226 allows for reduced impact energy on the housing 20 during a vehicle impact, such as a side impact. The second energy absorber 226 and the second side 220 may be identical to, and a mirror image of, the first energy absorber 126 and the first side 120 and the description above for the first energy absorber 126, including the interaction between the first energy absorber 126 and the first side 120, may also be applied to the second energy absorber 226. For example, the second energy absorber 226 includes the repeating pattern of cells 130, each cell 130 including the cell wall 135 with the cell wall thickness 136, as shown in FIG. 2. The cells 130 of the second energy absorber 226 each extend from the exposed end 142 spaced from the second rocker flange 204 to the bonded end 140 directly bonded to the side 220, as shown in FIG. 6B.

Figure 5:
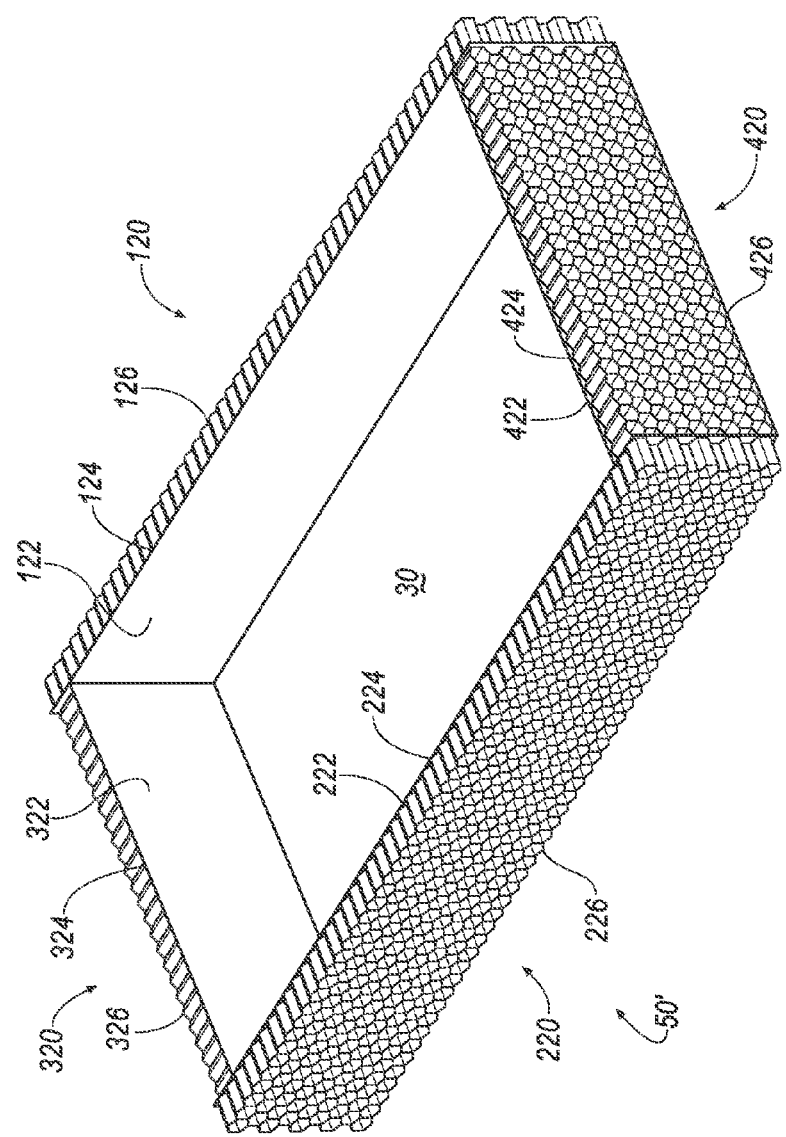
FIG. 5 is a perspective view of an alternate embodiment of the battery support with four energy absorbers attached to a side, a second side, a third side, and a fourth side.

As shown in FIG. 5, the battery support 50 may further include a third side 320 and a fourth side 420 spaced from the third side 320. The third side 320 and the fourth side 420 each extending from the bottom 30 between the side 120 and the second side 220. Both the third side 320 and the fourth side 420 may extend from the side 120 to the second side 220 and may overlap the side 120 and the second side 220. In an embodiment, the third side 320 and the fourth side 420 are spaced 1600-1800 mm apart, e.g., 1690 mm apart.

The third side 320 presents a third inner surface 322 and a third outer surface 324. The fourth side 420 presents a fourth inner surface 422 and a fourth outer surface 424. The third energy absorber 326 is bonded to the third outer surface 324. The fourth energy absorber 426 is bonded to the fourth outer surface 424. The third energy absorber 326 and the fourth energy absorber 426 may be bonded to the outer surface 324 and the fourth outer surface 424, respectively, in the same manner as the bond between the energy absorber 126 and the second energy absorber 226 to the outer surface 126 and the second outer surface 226, respectively, as set forth above. The four energy absorbers 120, 220, 320, 420 absorb impact energy from several directions, reducing the energy transfer to the battery support 50 and the battery 40.

During a side impact of the vehicle 100, an object, e.g., another vehicle, may impact the first rocker panel 106 and the first energy absorber 126. Since the cells 130 of the first energy absorber 126 directly face the object, the load from the object is directly parallel to the axes 132 of the cells 130, or the load includes a component parallel to the axes 132 of the cells 130. As such, the load transfers energy to the first rocker panel 106 and the cells 130 of the first energy absorber 126. As set forth above, in one embodiment, the cells 130 are hexagonal and made of aluminum alloy 6111-T4. In such an embodiment, since the cells 130 are hollow hexagonal tubes, the load is absorbed by the cell 130 along the central axis 132. The cells 130 may absorb energy along the central axis 132, and, thus absorbs more energy from the load before elastically and plastically deforming. As such, the cells 130 absorb energy from the object impacting the first rocker panel 106 and the first energy absorber 126, reducing the energy transfer to the side 120 and the battery 40.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An impact absorbing system comprising:
   a first rocker panel and a second rocker panel spaced from the first rocker panel;
   a housing including a bottom extending between the first and second rocker panels and a side extending from the bottom; and
   an energy absorber that is deformable relative to the side and defines a repeating pattern of cells;
   wherein the energy absorber is bonded to the side between the side and the first rocker panel and each cell has a central axis transverse to the side;
   wherein each cell includes a cell wall extending along the central axis from an exposed end to a bonded end directly bonded to the side.

2. The impact absorbing system of claim 1, further comprising a second side extending from the bottom and spaced from the side and a second energy absorber bonded to the second side between the second side and the second rocker panel.

3. The impact absorbing system of claim 2, further comprising a third side and a fourth side spaced from each other and extending from the side to the second side, and further comprising a third energy absorber bonded to the third side and a fourth energy absorber bonded to the fourth side.

4. The impact absorbing system of claim 1, wherein the cells are hexagonal, wherein the energy absorber and the housing are formed of aluminum and the energy absorber is brazed to the housing, and wherein each cell has a side length, and each cell wall has a cell wall thickness, the ratio of the side length to the cell wall thickness being 170-190 for each cell.

5. The impact absorbing system of claim 1, wherein each cell has a length of 50 mm along the central axis.

6. The impact absorbing system of claim 1, wherein the energy absorber and the housing are aluminum.

7. The impact absorbing system of claim 1, wherein the central axes of the cells are parallel to each other.

8. The impact absorbing system of claim 1, wherein each cell has a side length perpendicular to the central axis, and each cell wall has a cell wall thickness, the ratio of the side length to the cell wall thickness being 170-190 for each cell.

9. The impact absorbing system of claim 1, further comprising a battery supported on the bottom between the side and second side, and further comprising a first rocker flange supporting the first rocker panel, the first rocker flange being disposed between a portion of the first rocker panel and the housing.

10. A battery support comprising:
    a housing including a bottom and a side extending from the bottom, the side presenting an inner surface and an outer surface, the housing being configured to receive a battery for an electric vehicle at the inner surface; and
    an energy absorber that is deformable relative to the side and defines a repeating pattern of cells;
    wherein the energy absorber is bonded to the outer surface of the side and each cell has a central axis transverse to the outer surface;
    wherein each cell includes a cell wall extending along the central axis from an exposed end to a bonded end directly bonded to the side;
    wherein each cell has a side length perpendicular to the central axis, and each cell wall has a wall thickness, the ratio of the side length to the wall thickness being 170-190 for each cell;
    wherein each cell has a length of 50 mm along the central axis.

11. The battery support of claim 10, further comprising a second side extending from the bottom spaced from the side to define a battery compartment, the second side presenting a second inner surface facing the inner surface of the side and a second outer surface.

12. The battery support of claim 11, wherein a second energy absorber is bonded to the second outer surface.

13. The battery support of claim 12, further comprising a third side extending from the bottom between the side and the second side with a third energy absorber bonded to a third outer surface, and a fourth side extending from the bottom between the side and the second side and spaced from the third side with a fourth energy absorber bonded to a fourth outer surface.

14. The battery support of claim 10, wherein the cells are hexagonal, wherein the energy absorber and the housing are formed of aluminum and the energy absorber is brazed to the housing.

15. The battery support of claim 10, wherein the central axes of the cells are parallel to each other.

16. The battery support of claim 10, wherein the energy absorber and the housing are aluminum.

17. A vehicle comprising:
    a frame;
    a first rocker panel and a second rocker panel spaced from the first rocker panel, the first rocker panel and the second rocker panel being supported by the frame;
    a housing supported by the frame and including a bottom extending between the first and second rocker panels and a side extending from the bottom; and
    an energy absorber that is deformable relative to the side and defines a repeating pattern of cells;
    wherein the energy absorber is bonded to the side between the side and the first rocker panel and each cell has a central axis transverse to the side;
    wherein the cells each include a cell wall extending along the central axis from an exposed end to a bonded end directly bonded to the side.

18. The vehicle of claim 17, wherein the cells are hexagonal, wherein the energy absorber and the housing are formed of aluminum and the energy absorber is brazed to the housing.

* * * * *